No. 865,813. PATENTED SEPT. 10, 1907.
W. H. POWELL.
METHOD AND MEANS FOR CONTROLLING ELECTRIC MOTORS.
APPLICATION FILED JUNE 30, 1906.
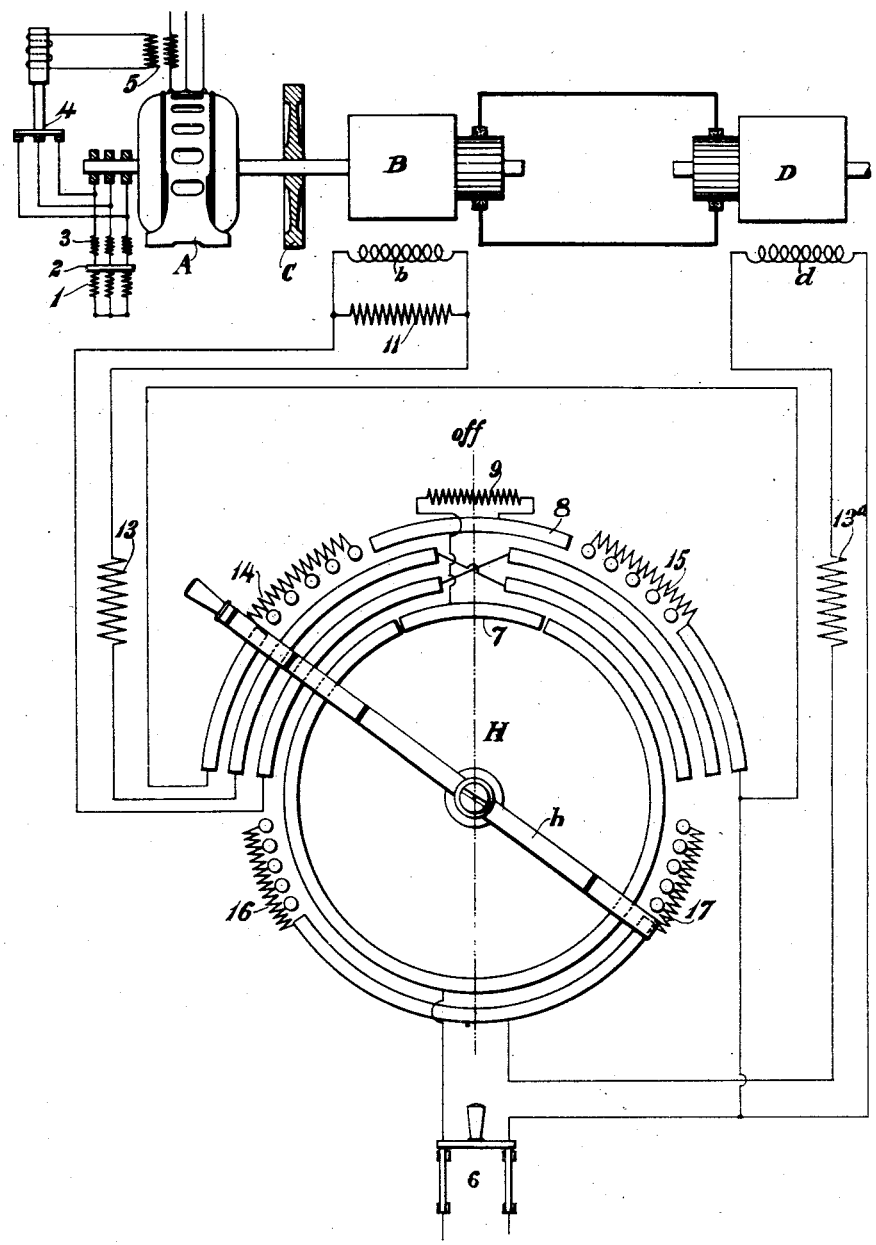
WITNESSES
INVENTOR
William H. Powell
BY
ATTORNEY

UNITED STATES PATENT OFFICE.

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

METHOD AND MEANS FOR CONTROLLING ELECTRIC MOTORS.

No. 865,813.        Specification of Letters Patent.        Patented Sept. 10, 1907.

Application filed June 30, 1906. Serial No. 324,126.

*To all whom it may concern:*

Be it known that I, WILLIAM H. POWELL, a citizen of the United States, residing at Norwood, in the county of Hamilton and State of Ohio, have invented certain new and useful Improvements in Methods of and Means for Controlling Electric Motors, of which the following is a full, clear, and exact specification.

My invention relates to motor control systems, and particularly to control systems for mill and hoisting motors.

In rolling mills and in mine hoisting machinery it is necessary that the moving parts be quickly and often reversed. Heretofore, steam engines have generally been used for this work. Certain electrical systems for doing the same work have been proposed by others, but these have all been unsatisfactory. In my copending application Serial No. 311,827 filed April 16th, 1906 I have illustrated and described a system in which a great many of the difficulties of these prior electrical systems have been overcome. In that application a system is described in which the working motor is supplied with current by a special generator, on whose shaft is a fly wheel, there being a single controlling arm which inversely varies in alternate steps the field strengths of the working motor and the special generator. It is sometimes advantageous, however, to have both the generator field and the motor field at maximum strength at the same time, and my present invention enables this result to be accomplished.

In one aspect my invention comprises the method of operating an electric motor at variable speed, which consists in successively and inversely varying its field strength and the electromotive force impressed on its armature, storing as mechanical energy any excess of supplied energy when the load on the motor is light, and supplying said stored energy as electrical energy when the load on the motor is heavy.

In a more specific aspect, my invention comprises the method of operating an electric motor at a variable speed and load which consists in supplying mechanical energy, converting it to electrical energy, supplying the electrical energy to the motor, successively and inversely varying the electromotive force of said electrical energy and the field strength of said motor, storing any excess of the mechanical energy when the power supplied exceeds the power demanded by the load and supplying said stored energy to the motor as electrical energy when the power demanded by the load exceeds the power supplied.

In another aspect my invention comprises the method of reversing an electric motor which consists in first strengthening its field, then diminishing to zero the electro-motive force impressed on its armature, then increasing in the reverse direction the electro-motive force impressed on its armature, and finally weakening its field.

From another point of view my invention consists of a motor control system comprising a motor, a source of current for supplying the motor armature, a second source of current for supplying the motor field windings, and means for successively and inversely varying the electro-motive force of said first source of current and the field strength of the motor.

In still another aspect my invention consists of a system of motor control, comprising a motor, and means for first increasing the strength of its field, then diminishing to zero the electro-motive force impressed on its armature, then increasing in the reverse direction the electro-motive force impressed on its armature, and finally weakening its field.

In a still more specific aspect my invention consists of a system of motor control, comprising a source of current, a motor supplied thereby, a fly-wheel mechanically connected to said motor, a generator driven by said motor, a second motor supplied by said generator, means for successively and inversely varying the field strengths of said second motor and said generator, and means for allowing said first motor to decrease in speed when the load on said second motor increases.

Other features of my invention will appear from the following description and accompanying drawings and will be particularly pointed out in the claims.

The single figure of the drawings shows diagrammatically one embodiment of my invention.

In this figure A is an electric motor of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength in the primary circuit of the motor, as through a series transformer 5. Other means for varying the speed of motor A may be used if desired. A generator armature B is driven by the motor A, being preferably directly connected thereto, and on the common shaft of the motor A and generator B is a heavy fly-wheel C. The generator B supplies current to the armature D of the working motor. The motor D may be used to drive any desired machinery.

The field windings b of the generator, and d of the working motor are supplied from any direct current source through a switch 6. These two field coils are controlled by a single controller H, which is arranged to vary the resistance in circuit respectively with these two field coils and to reverse the current in the coil b. The arm or handle h of this controller is divided into several electrically distinct parts. There are two sets of variable resistances, one set of which, resistances 14 and 15, are for the field circuit of the generator, and the other set, 16 and 17, for the field circuit of the working motor. With separate resistances for the generator and motor field circuits, it is possible to make the motor and generator substantial duplicates of each other, which, because of the different variations to be produced in the two fields, is generally impossible if the same resistance is used for both field circuits. For this reason it is deemed best to have separate resistances for the two field circuits, although in some instances a single resistance may suffice. If desired, instead of having the resistances 14 and 15 separate, the contacts of one may be connected to the corresponding contacts of the other, one of these resistances being omitted. The same cross connection may be applied to the contacts of resistances 16 and 17.

The controller is arranged so that when its arm h is moved on one side of the vertical, the resistances 14 and 17 are successively varied to control the speed of the motor D in one direction, and when moved on the other side of the vertical, the resistances 15 and 16 are successively varied to control the motor D in the other direction, the direction of current through the coil b being reversed as the arm h passes through its vertical position. Between the segments 7 and 8 of the controller is arranged a resistance 9 to take up the field discharge when the circuit through the coil b is broken. The resistance 9 is aided in this by a high esistance 11 permanently connected across the coil b.

A non-inductive resistance 13 is connected in series with the field coil b. This resistance has an ohmic value several times as great as that of the field coil with which it is in series. The purpose of this resistance is to diminish the time constant of the field magnet b, for the time constant of a circuit is a function of its inductance divided by its resistance. Therefore by increasing the resistance of the field circuit without increasing its inductance, the current strength being kept the same, the time constant of the field magnet is greatly reduced. By this means quick reversals of the motor D may be more readily obtained. If desired, a similar resistance 13ᵃ may be placed in the working motor field circuit in order to reduce its time constant, although the current in this circuit is never reversed, but only varied in strength.

The operation of the system is as follows; The primary circuit of motor A is closed and the motor started by moving the bar 2 to cut out the starting resistance 1. The switch 4 is held open by its solenoid at this time because of the heavy current required for starting the motor. If desired, other means may be used to insure the open condition of this switch during starting. After the motor has gained sufficient speed and the starting resistance has been cut out, the solenoid switch is allowed to close to cut out resistance 3 because of the decrease in the primary current of motor A. The fly-wheel C and generator armature B are also started with the motor A and the fly-wheel stores mechanical energy by its rotation. During this starting the arm h is preferably in its vertical or "off" position. The switch 6 now being closed, the motor field d is at its strongest, for it has none of the variable resistance 16 or 17 in circuit with it. The generator field b is de-energized. The arm h is now gradually moved from the vertical toward the horizontal, in the proper direction to give the motor D the desired direction of rotation. As this arm moves, say anti-clockwise, it first connects the field coil b to the direct current source through the whole resistance 14, and then gradually cuts said resistance out of circuit with coil b. When the entire resistance 14 has been cut out of circuit, the field coil b is at its strongest and the electromotive force delivered by the armature B has reached its maximum. So far no change has been made in the resistance in circuit with field coil d and therefore the field strength of the working motor is also still at its maximum. Thus at this time the motor D has a very strong torque. A further movement of the arm h cuts resistance 17 gradually into circuit with field coil d, thereby weakening the field of motor D and causing said motor to still further increase in speed. The speed which the motor D acquires depends upon the extent of movement of the arm h, the full speed being reached when the full resistance 17 has been included in circuit with the field coil d.

If the load is heavy the working motor requires more power for its starting than the motor A can furnish. The current rising in the primary of transformer 5 by reason of this heavy load, the switch 4 is opened, thus inserting resistance 3 into the rotor circuit of motor A. This increases the slip of motor A and permits the motor to slow down, thus allowing the fly-wheel C to give up some of the mechanical energy it has stored, which energy helps the motor A to drive generator B to supply electrical energy at the rate demanded by the motor D to drive its load.

As the arm is moved backward toward the vertical the field d is first strengthened and after it has reached its full strength the field b is weakened to decrease the electromotive force of armature B. Both the increasing of its field strength and the diminishing of the electromotive force impressed on its armature slow down the motor D, causing it to act as a generator to supply current to the armature B, the latter now serving as a motor to help restore energy to the fly-wheel C. There is a powerful braking effect on the working motor due to its acting as a generator. The diminished current in the primary of transformer 5 also causes the solenoid switch 4 to close, thereby increasing the speed of motor A so that the latter may also supply energy to the fly-wheel C. The fly-wheel thus stores up any excess of energy supplied when the rate of such supply exceeds the rate at which energy is demanded by the working motor, and gives up said stored energy whenever the rate of energy demanded is greater than the rate of energy supplied. When the arm h leaves the contacts of resistance 14 and slides over the segments 7 and 8, the resistance 9 is connected in circuit with the coil b to take the field discharge therefrom, the resistances 11 and 13 assisting in this. When the arm h is moved in the other direction from the vertical the above cycle is repeated save that the working motor D is caused to rotate in the other direction.

With my invention it is possible to quickly reverse motors, especially those of large capacity, and to do this with small waste of energy. It is also possible to diminish the carrying capacity of the mains which supply the motor A because of the greater uniformity with which energy is demanded of this motor. The capacity of machines B and D can also be greatly reduced because the maximum current and maximum voltage are demanded by the working motor at nearly the same time. Another great advantage of my invention is that the maximum armature current is less, and flows when the generator has a stronger field magnetism, commutation being thus greatly assisted. There are many other advantages of my invention which it is not necessary to point out, as they will be obvious to any one skilled in the art.

When I use the term "inversely" in this description and in the claims, I do not wish to limit myself to exact "inverse proportion", but intend the term to include any increase in one and decrease in the other of the two things specified.

I have described my invention in what I now consider to be its preferred form, but I aim to cover all those obvious modifications which readily occur to one skilled in the art.

Having thus described my invention, what I claim as new and desire to secure by Letters Patent is:

1. The method of operating an electric motor at variable speed, which consists in supplying mechanical energy at a substantially uniform rate, transforming the mechanical energy into electrical energy, supplying the electrical energy to the motor, successively and inversely varying the electromotive force of the electrical energy and the field strength of the motor, storing any excess of the supplied mechanical energy beyond that demanded by the motor at any time, and supplying said stored energy to the motor whenever required.

2. The method of operating an electric motor at variable speed, which consists in successively and inversely varying its field strength and the electromotive force impressed on its armature storing as mechanical energy any excess of supplied energy when the load on the motor is light, and supplying said stored energy as electrical energy when the load on the motor is heavy.

3. The method of operating an electric motor, at variable speed, which consists in converting mechanical energy into electrical energy, supplying the electrical energy to the motor, successively and inversely varying the electromotive force of the electrical energy and the field strength of the motor, storing any excess of the mechanical energy when its rate of supply exceeds the power demanded by the motor at any time, and supplying said stored energy to the motor as electrical energy whenever the power demanded by the motor is above that normally supplied.

4. The method of regulating the speed of an electric motor, which consists in supplying mechanical energy at a substantially uniform rate, converting said mechanical energy into electrical energy at a variable rate, supplying the electrical energy to the armature of the motor, energizing the field of the motor from a separate source, successively and inversely varying the electromotive force of the electrical energy and the field strength of the motor, storing any excess of mechanical energy whenever its rate of supply exceeds the rate at which energy is required by the motor load, and supplying said stored energy to the motor as electrical energy whenever energy is demanded by the load at a rate which exceeds the normal rate at which the mechanical energy is supplied.

5. The method of reversing an electric motor, which consists in first strengthening its field, then diminishing to zero the electromotive force impressed on its armature, then increasing in the reverse direction the electromotive force impressed on its armature, and finally weakening its field.

6. The method of varying the speed of an electric motor, consisting in converting mechanical energy into electrical energy, supplying the electrical energy to the motor armature, supplying the field of the motor entirely from a separate source, and successively and inversely varying the electromotive force of the electrical energy and the field strength of the motor.

7. The method of regulating and reversing an electric motor, which consists in supplying its armature from one source of current, supplying its field from another source of current, successively strengthening the motor field and diminishing to zero the electromotive force of said first source of current, and then successively increasing in the reverse direction the electromotive force of said first source of current and weakening the motor field.

8. The method of operating an electric motor at a variable speed and load, consisting in successively and inversely varying its field strength and the electromotive force impressed on its armature, storing as mechanical energy the excess of energy when the supplied power exceeds the power demanded by the load, and supplying said stored energy to the motor as electrical energy when the power demanded by the load exceeds the supplied power.

9. The method of operating an electric motor at a variable speed and load, which consists in supplying mechanical energy, converting it into electrical energy, supplying the electrical energy to the motor, successively and inversely varying the electromotive force of the electrical energy and the field strength of the motor, storing any excess of the mechanical energy supplied when its rate of supply exceeds the rate at which energy is demanded by the load, and supplying said stored energy to the motor as electrical energy when the rate at which energy is demanded by the load exceeds the rate at which the mechanical energy is supplied.

10. A system of motor control, comprising a dynamo-electric generator driven by a source of substantially constant power, a motor supplied by the generator, means for successively and inversely varying the electromotive force of the generator and the field strength of the motor, and means for mechanically storing any excess of the energy supplied by the driving source and supplying said stored energy to the motor whenever required.

11. A system of motor control, comprising a motor, means for successively and inversely varying its field strength and the electromotive force impressed on its armature, and means for mechanically storing any excess of supplied energy when the motor load is light and for supplying said stored energy to the motor as electrical energy when the motor load is heavy.

12. A system of motor control, comprising a dynamo-electric generator, a motor supplied thereby, means for successively and inversely varying the electro-motive force of the generator and the field strength of the motor, means for storing any excess of the mechanical energy supplied to the generator when its rate of supply exceeds the power demanded by the motor at any time, and means for causing said stored energy to be supplied to the motor whenever the power demanded by the motor is above that normally supplied.

13. A motor control system, comprising a source of substantially constant mechanical power, a generator driven thereby, a variably loaded motor whose armature is supplied by the generator, a separate source of current which supplies the field of the motor, means for successively and inversely varying the electromotive force of the generator and the field strength of the motor, means for storing any excess of the mechanical energy supplied by the source when its rate of supply exceeds the rate at which energy is demanded by the load on the motor, and means for causing said stored energy to be supplied to the motor as electrical energy when energy is demanded by the load at a rate which exceeds the normal rate at which the mechanical energy is supplied.

14. A system of motor control, comprising a motor, means for first increasing the strength of its field, then diminishing to zero the electromotive force impressed on its armature, then increasing in the reverse direction the electromotive force impressed on its armature, and finally weakening its field.

15. A system of motor control comprising an electric motor, a source of current supplying the motor armature, a second source of current supplying the motor field coil, and means for first strengthening the motor field, then diminishing to zero the electromotive force of said first source of current, then increasing in the reverse direction the electromotive force of said first source of current, and finally weakening the motor field.

16. A motor control system, comprising a motor, means for successively and inversely varying its field strength and the electromotive force impressed on its armature, means for mechanically storing any excess of energy when the supplied power exceeds the power demanded by the motor load, and means for causing said stored energy to be supplied to the motor as electrical energy when the power demanded by the motor load exceeds the supplied power.

17. A motor control system, comprising a source of mechanical power, a dynamo-electric generator driven thereby, a motor supplied by the generator, means for successively and inversely varying the electromotive force of said generator and the field strength of said motor, means for storing any excess of mechanical energy supplied by said source when its rate of supply exceeds the rate at which energy is demanded by the motor load, and means for causing said stored energy to be supplied to the motor as electrical energy when energy is demanded by the motor load at a rate which exceeds the rate at which mechanical energy is supplied by the source.

18. In combination, a source of power, a generator driven thereby, a motor supplied by the generator, means for successively and inversely varying the field strengths of the generator and the motor, a fly-wheel on the shaft of the power source, and means for causing the fly-wheel to give up its energy when the load on the motor rises above the normal.

19. In combination, a source of power, a generator driven thereby, a motor supplied by the generator, means for successively and inversely varying the resistances of the field circuits of the generator and the motor, a fly-wheel on the generator shaft, and means for allowing said fly-wheel to give up its energy when the motor load rises above normal.

20. A system of motor control, comprising a motor, a generator supplying said motor, a fly-wheel on said generator shaft, and means for successively and inversely varying the field strengths of said generator and said motor.

21. A system of motor control, comprising a motor, a generator supplying said motor, a fly-wheel on said generator shaft, means for successively and inversely varying the field strengths of said generator and said motor, and means for permitting the fly-wheel to give up its energy when the load on the motor is heavy.

22. A system of motor control, comprising a motor, a generator supplying said motor, a fly-wheel on said generator shaft, means for permitting the fly-wheel to give up its energy whenever the load on the motor exceeds a predetermined value, and a controller for successively and inversely varying the field strengths of the generator and the motor to vary the speed of the motor and to cause energy to be restored to the fly-wheel while the motor is being retarded.

23. A system of motor control, comprising a motor, a generator supplying said motor, a fly-wheel on said generator shaft, means for successively and inversely varying the field strengths of said generator and said motor, and means for causing the generator to run slower when the motor load is heavy than when the motor load is light.

24. A system of motor control, comprising a motor, a generator supplying the armature of said motor, a separate source of current supplying the fields of said generator and said motor, a fly-wheel on said generator shaft, and means for successively and inversely varying the field strengths of said generator and said motor.

25. A system of motor control, comprising a motor, a generator supplying the armature of said motor, a fly-wheel on said generator shaft, means for successively and inversely varying the field strengths of said generator and said motor, and means for allowing the fly-wheel to give up its energy when the load on the motor is heavy.

26. A system of motor control, comprising a motor, a generator supplying the armature thereof, a fly-wheel on the generator shaft, means for permitting the fly-wheel to give up its energy whenever the load on the motor exceeds a predetermined value, and a controller for successively and inversely varying the field strengths of the generator and the motor to vary the speed of the motor and for causing energy to be restored to the fly-wheel while the motor is being retarded.

27. A system of motor control, comprising a motor, a generator supplying the armature of said motor, a fly-wheel on said generator shaft, means for successively and inversely varying the field strengths of said generator and said motor, and means for permitting the generator to run slower when the motor is heavily loaded than when the motor is lightly loaded.

28. A system of motor control, comprising an induction motor, a generator driven thereby, a fly-wheel on the shaft of said induction motor, a working motor supplied by said generator, and means for successively and inversely varying the field strengths of the working motor and the electromotive force of the generator.

29. A system of motor control, comprising an induction motor, a generator directly connected thereto, a fly-wheel on the shaft of the induction motor, a working motor supplied by the generator, and means for successively and inversely varying the field strengths of the generator and the working motor.

30. A system of motor control, comprising an induction motor, a generator driven thereby, a fly-wheel on the shaft of the generator, a working motor supplied by the generator, means for successively and inversely varying the field strength of the working motor and the electromotive force of the generator, and means for decreasing the speed of the induction motor when a heavy load is placed on the working motor.

31. A system of motor control, comprising a generator, a motor whose armature is supplied by the generator, a separate source of current for supplying the field coils of the generator and the motor, a permanent resistance in the generator field circuit, variable resistances in the field circuits of the generator and the motor, and means for successively and inversely varying said variable resistances.

32. A system of motor control, comprising a generator, a motor whose armature is supplied thereby, a separate source of current for supplying the field magnets of the generator and the motor, and means for successively and inversely varying the resistances of said field circuits and for reversing the direction of current through the generator field circuit.

33. A system of motor control, comprising a generator, a motor whose armature is supplied thereby, a separate source of current supplying the field magnets of the generator and the motor, means for successively and inversely varying the resistances of said field circuits and for reversing the direction of current through the generator field circuit, and a permanent resistance in the generator field circuit.

34. A system of motor control, comprising a generator, a motor, and means for successively and inversely varying the field strengths of the generator and the motor, and for reversing the direction of current in the generator field circuit.

35. A system of motor control, comprising a generator, a motor whose armature is supplied thereby, a separate source of current supplying the field coils of the generator and the motor, and means for successively and inversely varying the resistances of said field circuits and for reversing the current in said generator field circuit after its resistance has been increased to the maximum.

36. A system of motor control, comprising a source of current, a motor supplied thereby, a fly-wheel mechanically connected to said motor, a generator driven by said motor, a second motor supplied by said generator, means for successively and inversely varying the field strengths of said second motor and said generator, and means for allowing said first motor to decrease in speed when the load on the second motor increases.

37. A system of motor control, comprising a generator, a motor supplied thereby, means for successively and inversely varying the field strengths of said generator and said motor and reversing said generator field, and a resistance permanently in said generator field circuit.

38. A system of motor control, comprising a generator, a motor supplied thereby, means for successively and inversely varying the field strengths of said generator and said motor and for reversing said generator field, and resistances permanently in the field circuits of the generator and the motor.

39. A system of motor control, comprising a generator, a motor supplied thereby, resistances in the field circuits of said generator and said motor, means for successively and inversely varying said resistances, and for reversing the current in the generator field circuit after the full resistance in said circuit has been cut in, and a high resistance connected across the generator field terminals.

40. A system of motor control, comprising a generator, a motor supplied thereby, variable resistances arranged to be connected in the field circuits of the generator and motor respectively, and a regulating and reversing rheostat so connected and arranged that it successively and inversely varies the resistances of the generator and motor field circuits, and can reverse the current in the generator field circuit after the resistance in said circuit has reached its maximum.

41. A system of motor control, comprising a generator, a motor whose armature is supplied thereby, a separate source of current for supplying the field circuits of said motor and said generator, and a regulating and reversing rheostat so connected and arranged that it successively and inversely vary the resistances of said field circuits, and reverse the current in the generator field circuit when the motor field circuit has its minimum resistance.

42. A system of motor control, comprising a generator, a motor supplied thereby, separate variable resistances for the field circuits of the generator and the motor, and a single controller arranged to increase the motor speed by first cutting all of one of the resistances out of the generator field circuit, and then cutting all of the other resistance into the motor field circuit.

43. A system of motor control, comprising a generator, a motor supplied thereby, separate variable resistances for the field circuits of the generator and the motor, and a single controller arranged to vary said resistances successively and inversely.

44. A system of motor control, comprising a generator, a motor supplied thereby, separate variable resistances for the field circuits of said generator and motor, and a single controller arranged to vary either of said resistances when the other resistance is fully cut out.

45. A system of motor control, comprising a generator, a motor supplied thereby, separate variable resistances for the field circuits of the generator and the motor, and a single controller arranged to vary the motor speed by first gradually cutting out all of one resistance from its circuit and then gradually cutting all of the other resistance into its circuit.

46. A system of motor control, comprising a generator, a motor supplied thereby, separate variable resistances for the field circuits of the generator and the motor, and a single controller arranged to vary said resistances successively and inversely, each resistance being varied only when the other resistance is fully cut out.

47. A system of motor control, comprising a generator, a motor supplied thereby, separate resistances in the circuits of said generator and said motor, means for successively and inversely varying said resistances and for reversing the current in the generator field circuit after the full resistance in said circuit has been cut in, and a resistance arranged to be connected across the terminals of the generator field circuit when said circuit is disconnected from its source of supply.

48. A system of motor control, comprising a generator, a motor supplied thereby, and a single controller so connected and arranged that as its arm is moved from "off" position, the generator field circuit is first closed, and the resistance of said circuit gradually decreased to a minimum and then the resistance of the motor field circuit gradually increased to a maximum.

49. A motor control system, comprising a purely separately excited motor, a generator supplying the armature of said motor, and means for successively and inversely varying the field strengths of said generator and said motor.

In testimony whereof I affix my signature, in the presence of two witnesses.

WILLIAM H. POWELL.

Witnesses:
  GEO. B. SCHLEY,
  FRED J. KINSEY.